July 21, 1964

H. B. BEBB ET AL 3,141,920

THIN FILM COLOR DISPLAY DEVICE

Filed Dec. 30, 1960

July 21, 1964  H. B. BEBB ETAL  3,141,920
THIN FILM COLOR DISPLAY DEVICE
Filed Dec. 30, 1960  3 Sheets-Sheet 3

INTERFERENCE FILM EFFECT

BIREFRINGENCE EFFECT

OPTICAL ACTIVITY EFFECT

3,141,920
THIN FILM COLOR DISPLAY DEVICE

Herbert B. Bebb, Hurley, and Herbert E. Heath, Woodstock, N.Y., Reginald B. Hilborn, Jr., State College, Pa., and Fred S. Maddocks, Hurley, N.Y., assignors to International Business Machines Corporation, New York, N.Y., a corporation of New York
Filed Dec. 30, 1960, Ser. No. 79,701
6 Claims. (Cl. 88—1)

This invention relates to display devices and more particularly to Kerr magneto optic apparatus for presenting alpha-numeric, pictorial and other graphic representations of high contrast.

The Kerr magneto optic effect, which has been long known, relates to phenomena whereby polarized light undergoes an effect historically viewed as rotation when it is reflected by the surface of a magnetized element. The direction of rotation is controlled by, and is therefore reversible with, the direction of magnetization of the reflector.

More recently, considerable work has been done in investigating the properties of magnetic thin films, and it has been found that thin films of, for example, iron can be so manufactured as to have magnetic anisotropy whereby domains of the film have two diametrically opposite stable states of magnetization. Bistable thin films of this kind can be switched at high speed with relatively weak magnetizing forces, and thus are ideal in many respects for fabrication into a mosaic reflector for utilization of the Kerr effect to produce a solid state display apparatus. Difficulty arises however in that certain magnetic thin film materials, such as nickel-iron, which have low coercivity and other desirable qualities, produce a rather small amount of Kerr rotation and correspondingly poor contrast in the aforestated type of display. On the other hand, certain materials which provide larger Kerr rotation exhibit undesirably high coercivities which militate against their use where the objective is to produce a mosaic display comprising a multitude of separately controllable elements.

In accordance with the present invention, a polychromatic light source is utilized in the display, and the light is subjected to dispersion into a plurality of color components, with the orientation in space of the light components corresponding to the different colors being shiftable, and their polarization being otherwise changeable, by switching of the magnetic domains of the Kerr reflector. As passed by an analyser filter, the contrast between bundles of light corresponding to elements of the mosaic display is a color contrast and need not have any intensity contrast at all. For example, the display may be such that characters are represented in red on a blue background so as to be readable clearly by eye even though there may be little or no difference in intensity of the two colors. Thus, such a display may be viewed directly or through any suitable optical means, such as a lens system and a display screen.

Accordingly, it is an object of the invention to provide an improved solid state display capable of providing mosaic presentation of geometric forms.

Another object of the invention is to provide an improved display apparatus as aforesaid which yields color contrast between elements of the display mosaic.

Still another object of the invention is to provide a color contrast display as aforesaid which is adapted to construction with a myriad of mosaic elements which are switchable individually by low value currents such as may be provided conveniently in an x–y matrix adapted to be employed in a solid state device.

Another object of the invention is to provide a display as aforesaid which employs to advantage bistable residual properties of magnetic thin film means arranged in a Kerr reflector configuration for control of the display.

The foregoing and other objects, features and advantages of the invention will be apparent from the following more particular description of preferred embodiments of the invention, as illustrated in the accompanying drawings.

Figure 1:
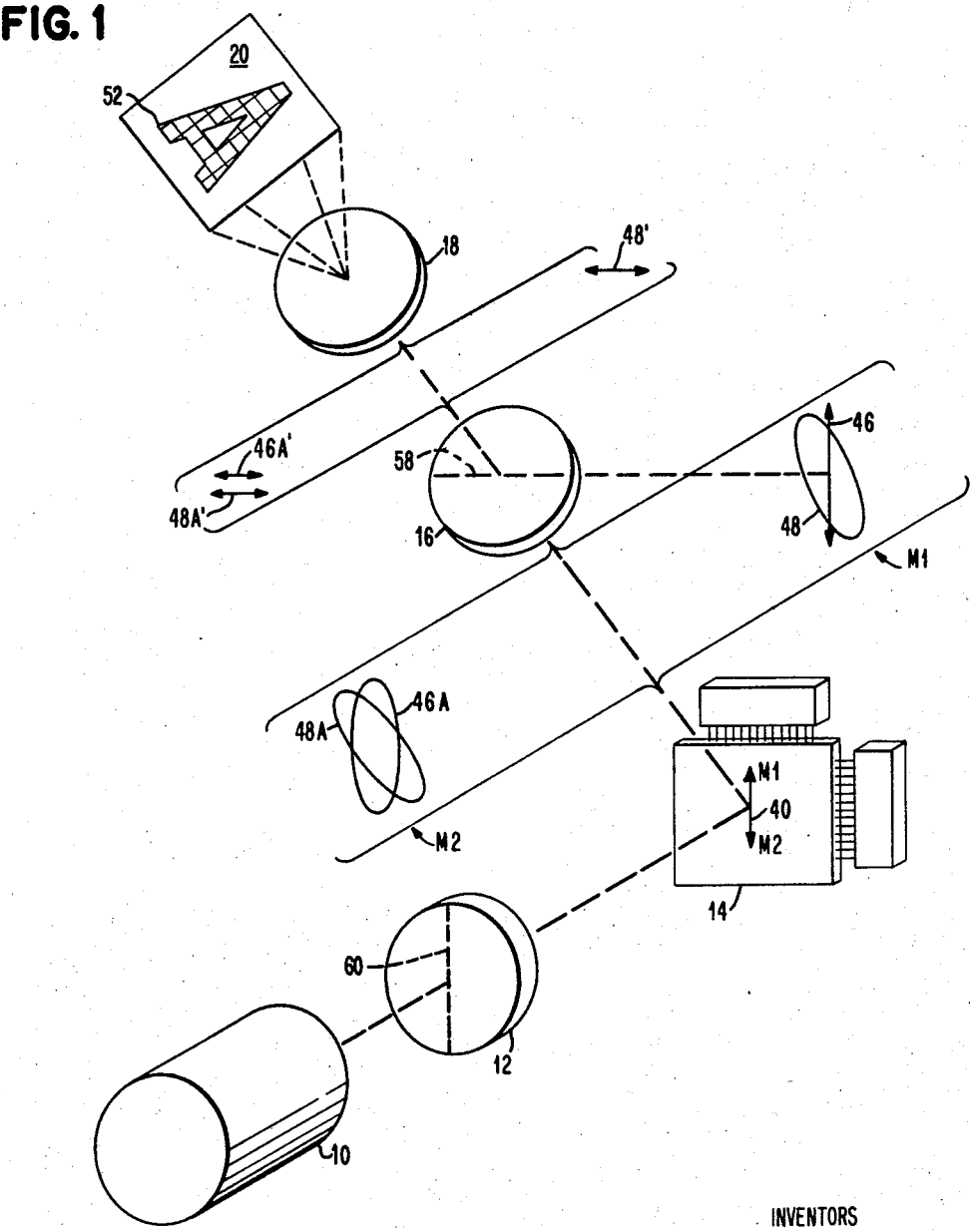
FIG. 1 is a diagrammatic representation, in perspective, illustrating an organization of apparatus suitable for carrying out certain embodiments of the invention.

Referring more particularly to FIG. 1, a Kerr magneto-optic effect display embodying the invention may take the form of a source 10 of collimated polychromatic light, a plane polarizing filter 12, a mosaic controllable Kerr reflector apparatus 14, a second plane polarizing filter 16 employed as an analyser, and suitable output means, such as a focusing lens system indicated at 18 and a screen or the like 20.

Figure 2:
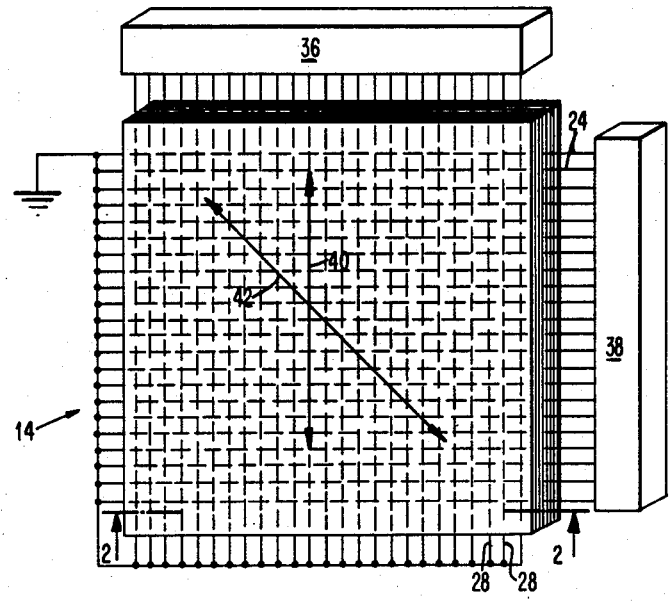
FIG. 2 is an enlarged diagrammatic, perspective view of the Kerr magneto-optic reflector and control apparatus of FIG. 1.
Figure 3:
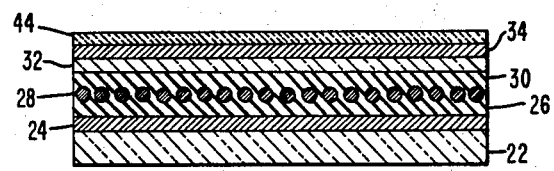
FIG. 3 is a cross sectional view of the Kerr reflector element of FIG. 2, taken about along line 2—2 of that figure and showing a coating thereon utilized in certain embodiments of the invention.

Referring to FIGS. 2 and 3, the Kerr reflector apparatus 14 may comprise, for example, a sandwich structure including a glass substrate 22, a first array of parallel drive lines 24 evaporated or otherwise placed thereon, insulation such as an evaporated layer 26 of silicon monoxide over the first array, a second array of parallel lines 28 in quadrature to the first, a physical buffer layer such as a further deposition 30 of silicon monoxide, a thin glass plate 32, and a magnetically anisotropic thin ferromagnetic film 34, such as an iron film in the order of 1,000 angstroms thick, evaporated or otherwise applied in place on the plate 32. The drive lines 24, 28 form a grid in proximity to the film and each line of each array is connected in a corresponding, individually controllable current circuit through decoder means 36, 38.

By energization of a particular line of the array 24 and a particular line of the array 28, the current relationship at an intersection of the two chosen lines can provide a switching flux which is effectively greater than would result from either of them alone. This type of control is known as "coincident current control" and decoder means suitable for operation of such devices are well known in the art of data processing systems. The display of the invention may be employed as an output of such a system. However, the decoder means 36, 38 can be thought of simply as an array of single pole, double throw switches, one for each line, and positive and negative electric sources therefor, whereby the drive lines 24, 28 may be energized in any arbitrary pattern so as to set up a corresponding pattern of magnetizing force in the iron film.

As is known in the art of thin magnetic films, an iron film as described above may be deposited by evaporation in a vacuum in the presence of a magnetic field and when so fabricated it will have a preferred "easy" axis of magnetization whereby it possesses, by a large margin, highest remanence in directions parallel and anti-parallel to that axis. The magnetic domains in the film may be switched from one preferred direction of magnetization to the other by and upon application thereto of a field having components which are transverse and anti-parallel to the last remanent state of magnetization, after which switching action external field application may be discontinued and the new remanent state will be maintained. Accordingly, with the apparatus arrangement shown, wherein the iron film 34 has its "easy" axis aligned as shown at 40, and the coincident current arrays 24, 28 are arranged to provide, reversibly, switching magnetic force as shown at 42, large or small areas may be switched in accordance with the operation of one or more coincident current cites. Such switched areas, by the magnetically anisotropic nature of thin iron film, take on the aspect of single magnetic domains homogeneously with and throughout the commonly magnetized area, oppositely magnetized adjacent areas remaining in their previous state. Accordingly a mosaic of any configuration can be provided under the control of the decoder means 36, 38, with the binary definition of the mosaic being in terms of direction of magnetization along the easy axis 40. Where the remanent magnetization is in the plane of the film, as is the case in the above described iron film, the film should be oriented in the apparatus so that its easy axis 40 lies in the plane of incidence of the light employed by the apparatus, as shown.

Referring again to FIG. 3, the multi-layer apparatus shown includes a coating 44 on the reflective surface of the iron film 34, which coating will be described in further detail hereinafter, and the combination of the coating 44 and the magnetized iron film 34 constitutes a rotationally dispersive means, that is, the light reflected from the structure is dispersed rotationally in accordance with color components thereof. When, as here, the light has been initially plane polarized, by the filter 12, the dispersed color components of the reflected light occupy discrete, relatively rotated patterns. Characteristically, these patterns will be elliptically polarized but a certain color may be linearly polarized, depending on the relative orientation of the plane of polarization of the light passed by the filter 12 and that of the dispersion pattern of the rotationally dispersive means. The Kerr component of each color enters into the formation of the reflected polarization pattern of that color, so that the optically dispersive characteristic is under the control of the direction of magnetization of the pertinent domain of the Kerr reflector.

Accordingly, considering for simplicity a single bundle of light corresponding to a single magnetic domain in the Kerr reflector, if it is assumed that the polarizer 12 and the reflector 14 of FIG. 1 are so aligned that a first color 46 is plane polarized as it is reflected from the device 14 when the magnetization state of the pertinent domain in the iron 34 is in a first direction labeled M1 in FIG. 1, that same color as 46A will be elliptically polarized when the magnetization state of the domain is changed to the opposite state, labeled herein M2. In the meantime all other colors during the state M1 will be elliptically polarized as indicated by the representation of one of them at 48, with the major axis of that ellipse being rotated from the plane polarization of the first color 46, various colors being rotated various amounts and having various eccentricities, that is various major to minor axis ratios. In the M2 state a general situation has been shown wherein not only the color 46A but also the other color 48A is elliptically polarized, although in special cases two colors can be found wherein in the M1 state one color is plane polarized and in the M2 state the other color is so plane polarized. This not being eccential to the operation of the device, a more general situation is shown. It should be understood, further that with several colors there will be as many grades of rotation of major axes and degrees of eccentricity in each of the two magnetization states and that each of these characteristics changes upon switching from the M1 state to the M2 state in a manner which is individual to each color.

It will be seen now that if the analyser filter 16 is set to extinguish the plane polarized light 46 only the other color component 48 will be passed by that filter in the M1 state, as shown at 48'. Then in the M2 state, both colors being elliptically polarized, components of each will be passed by the filter 16 as shown at 46A', 48A', respectively. The addition of color 46A' to color 48A' results in a third color, visually, which is contrasted to color 48' when corresponding portions of the reflector are in the M1 and M2 states simultaneously.

Depending on the accuracy of the equipment and convenience in choosing color components to be displayed, it is adequate, and in some cases preferable that less than the extreme situation of complete extinction of a perfectly polarized color component (e.g. 46) be employed; that is, since the various color components are variable in their orientation and more importantly variable in their respective states of an elliptic eccentricity under the control of the magnetization (the plane polarization merely being a special case of such eccentricity), effective color change can be had by mere change of such relationships of orientation and eccentricity with respect to various color components and corresponding change of the portions thereof passed by the analyser 16.

Since, as shown in FIGS. 2 and 3, the Kerr reflector apparatus is provided with means to set up a mosaic of magnetization states M1 and M2, the light reflected will be altered in a like mosaic pattern and the light passed by the analyser 16 will have a corresponding color pattern. Accordingly, the pattern obtained can be utilized to produce an output 52 (FIG. 1) which is observable as a color contrast display, such as by means of the projection lens system 18 and the screen 20.

Any of the plurality of known means, and combinations thereof, may be employed to provide the desired rotary dispersion, this dispersion being combined in accordance with the invention with the mosaic controllable Kerr reflector which itself further affects the dispersion by reversal of the magnetically induced component, known as the Kerr component, under the control of the direction of magnetization as set up in the aforesaid mosaic. For example, as shown in FIG. 3, the Kerr reflector apparatus may be provided with the aforementioned optical coating 44 which may be birefringent, interference productive, or optically active, or any combination thereof.

Figure 4:
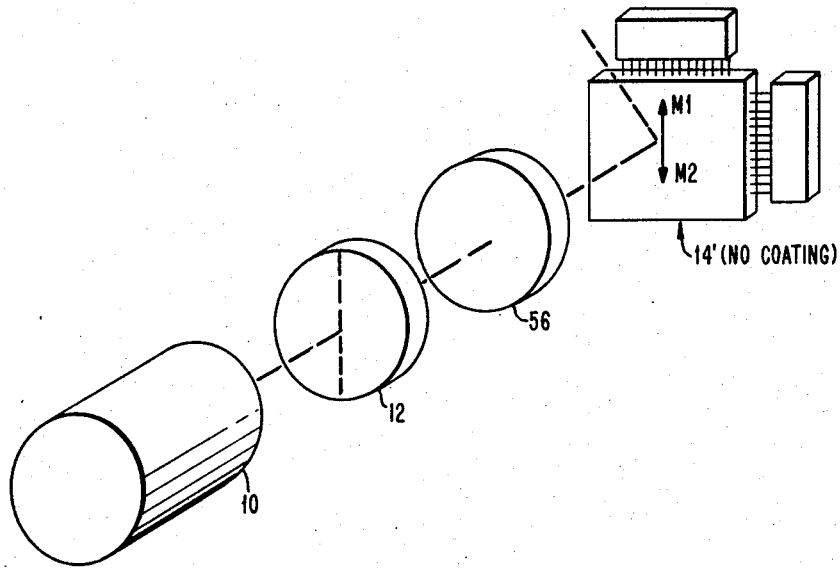
FIG. 4 is a view showing fragmentarily an apparatus arrangement similar to that of FIG. 1 but modified for employment in accordance with other embodiments of the invention.

Alternatively, the dispersive means can be removed physically from the Kerr reflector such as by provision, as shown in FIG. 4, of an optically active or a birefringent transmission element 56 in the path of light between the polarizer and the Kerr reflector, in which case the coating 44 is unnecessary. If this dispersing element 56 is purely optically active, as is for example a Z-cut quartz crystal, the light, emerging from it will be rotationally dispersed into a number of angularly related plane polarized color components. However, when such light is reflected from the surface of the metal reflector of the device 14' (the device 14' being identical to device 14 of FIGS. 2 and 3 except that the coating 44 is omitted), at least all but one of the color components will be elliptically polarized, with the situation being exactly as described in FIG. 1, and with the alteration of polarization and dispersion being under the control of the magnetic state of the reflector as also described with respect to FIG. 1.

If the dispersive element 56 is a birefringent means, such as an X or Y-cut quartz crystal, the effect will be the same as that achieved by the coating 44 as described with regard to FIG. 3. Further analysis and explanation of the mechanics of plane rotated color components, birefringently dispersed color components and interference induced color components upon reflection from a metallic surface can be found in the "Journal of the Optical Society of America," vol. 45, No. 2 (February 1955), pages 89 through 97.

In the cases of briefringence and interference, the light is altered by color-dependent phase changes introducing both rotation and ellipticity which, because they are the same in their effect on passage of light through the analysing filter 16, are referred to herein collectively as rotary dispersion. These phase changes may be compensated by (nearly color independent) phase changes introduced by the mechanics of reflection from a metal surface. Moreover, the compensation effected by the metal reflector is a function of the angle of each color component major axis with respect to the plane of incidence.

In the case of optical activity (i.e. rotation by, for example a Z cut quartz element 56), the color components are rotated relatively without losing their individual plane polarization, but upon reflection from the metal surface 34 all but one color will be elliptically polarized since, in practical terms, only one can have the specific angular orientation, relative to the plane of incidence, in which the metal will reflect without introducing ellipticity. Accordingly, in each case, whether the coating 44 or the separate dispersive element 56 is employed, the metallic reflector 34 of the device 14 or 14' enters into the combination to provide the possibility of, for practical purposes, an unique linearly polarized or a nearly linearly polarized color component for best color contrast in accordance with the invention.

As employed in the present invention, there is the added effect of the fact that the reflector metal is magnetized. This results in the provision of a Kerr component whereby the aforesaid angular relationships required for compensation or non-ellipticising reflection, respectively, are altered from the non-magnetized case, and, importantly are reversible between two special cases with reversal of the Kerr component. Accordingly, the color seen through the analyser 18 is variable by alteration of the magnetic state of the reflector portion associated with a particular bundle of light observed.

Figure 5:
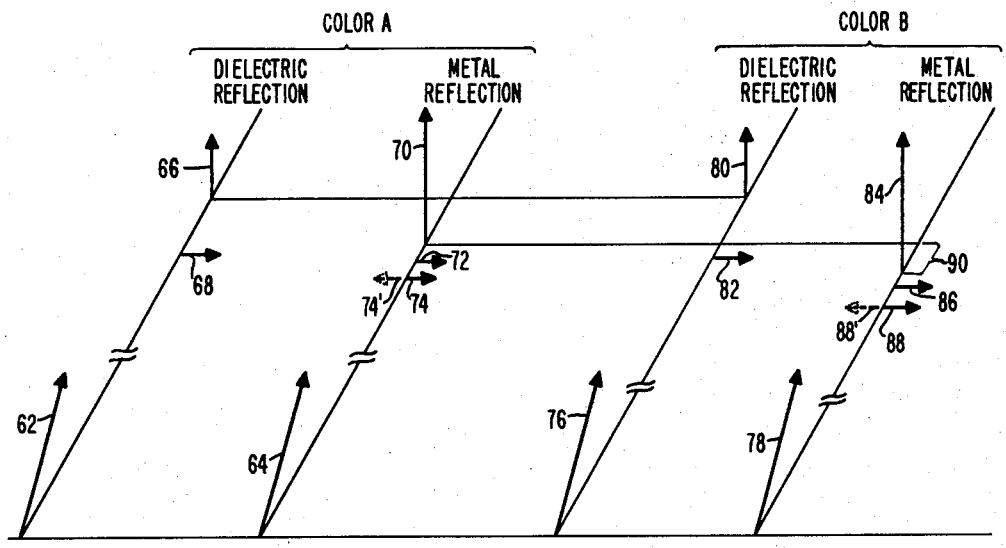
FIGS. 5, 6 and 7 are diagrammatic representations of interference film, birefringence, and optical activity effects employed in accordance with the invention.
Figure 6:
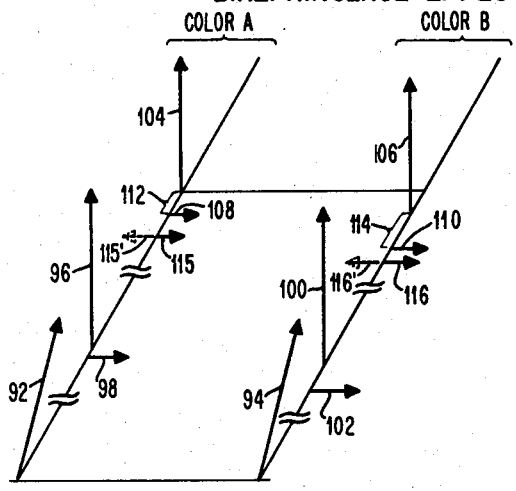
Figure 7:
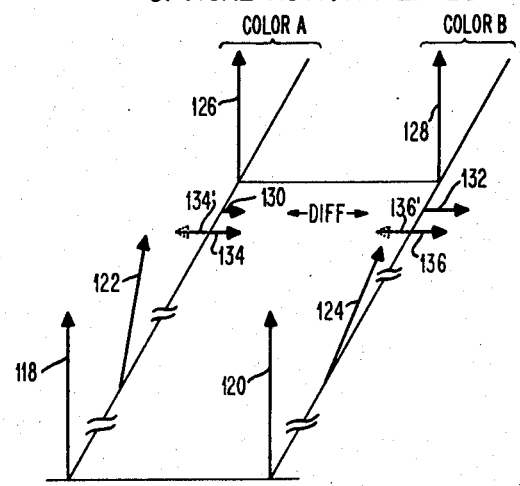

The foregoing is illustrated qualitatively in FIGS. 5, 6 and 7. Turning to FIG. 5, plane polarized light vectors 62 and 64 are representative of the light of one color, designated color A, as it is incident upon the Kerr reflector 14 of FIGS. 1–3, in the case wherein the coating 44 is of interference productive, i.e. dielectric material. These vectors represent adjacent bundles of light which will merge upon leaving the dielectric surface after the reflection process. The light energy 62 is reflected from the air-dielectric interface to provide a p component 66 and an n component 68 lagging in phase with respect to the p component, while the other portion 64 of the incident light energy of the same color is reflected from the dielectric-metal interface to provide a p component 70, a lagging n component 72 and a further lagging Kerr component 74, the last of which is reversible to the state indictaed at 74' with reversal of magnetization of the metal film. In the meantime plane polarized light of another color, designated color B and indicated by the vectors 76, 78 is incident upon the Kerr reflector 14. One portion of the energy, indicated by the vector 76, is reflected from the air-dielectric interface to provide a p component 80 and a lagging n component 82, while the other portion of the energy of the color B indicated by the vector 78 is reflected from the dielectric metal interface to provide a p component 84, a lagging n component 86, and a Kerr component 88 reversible as indicated at 88' with reversal of the magnetization state of the reflector. It should be noted that the phase relation of the two families of components which have resulted from energy which has been reflected from the dielectric-metal interface, and has twice traversed the dielectric, is color responsive as indicated at 90, and if, for example, the component 86 is of such an amplitude as to combine with the component 82 and either of the components 88 or 88' to form a new n component which is in phase with the resultant of the two p components 80, 84 of the same color, thereby yielding light which is plane polarized at some angle, then an analyser filter 16 (FIG. 1) having its polarization axis 58 set across that new plane of polarization will result in elimination of the color represented by the vectors 76, 78 when the reflector is in one magnetic state but not when it is in the other.

In FIG. 6, the case of pure birefringence, such as is provided by an X or Y-cut quartz crystal in the element 56 of FIG. 4, is considered. In this case, the two color components under consideration are illustrated by the vectors 92, 94 as they originate from a plane polarized source. Upon transmission through the birefringent crystal each color component will become elliptically polarized as indicated by the respective p and n components 96, 98 of color A and 100, 102 of color B. Upon reflection from the Kerr reflector 14' of FIG. 4, the n components 108, 110 undergo further phase dispersion whereby a color dependent difference in phase lag 112, 114 is present between the respective n components 108, 110 and the corresponding p components 104, 106. At the same time Kerr components 115 or 115' and 116 or 116' are generated for the respective colors. It will be seen that if the n component 110 and the Kerr component 116 or 116' of one of the colors so combine as to yield, with the corresponding p component 106, plane polarized light when reflector is magnetized in a given direction, that plane polarized light can be suppressed by the analyser filter when the axis of the same is oriented in crossed relation to the thus generated resultant vector. At the same time the components 104, 108 and 115 or 115' of the other color, being differently phase related, may yield elliptically polarized light which cannot be suppressed by the analyser. Accordingly, switching the magnetic state of the reflector will result in insertion or deletion of the color represented by the vector 94.

Turning to FIG. 7, the situation involving optical activity, such as furnished by a Z-cut quartz crystal as the element 56 in FIG. 4, is illustrated. In this figure the plane polarized light energy from the source is indicated by the vectors 118, 120 of two colors A and B, respectively, under consideration. The element 56 will rotate color A by a certain angle and color B by a different angle as shown at 122 and 124, respectively. Accordingly, the plane of polarization of the two color components arriving at the surface of the Kerr reflector will be different and while the corresponding p components 126, 128 will be nearly the same, the n components 130, 132 will differ considerably in amplitude. Accordingly, these n components will combine differently with the Kerr components 134 or 134' and 136 or 136', respectively, whereby the possibility exists that one color but not the other will be plane polarized, and thus suppressible by the analyser, when the reflector is in one magnetic state but not when it is in the opposite magnetic state. Accordingly, there again exists the possibility of suppressing one of the colors in a markedly variable manner under the control of the Kerr component of that color and thus under the control of the magnetic state of the Kerr reflector.

In the foregoing discussion "p component" denotes the component lying in the plane of incidence, "n component" denotes the component which is normal to that plane of incidence, and the Kerr components shown are those generated by the p components, since those other Kerr components which would be generated by the n components would be relatively insignificant, where, as assumed for simplicity in the foregoing explanation, the plane of polarization of the source light is in or near the plane of incidence so that the p components are very much larger than the n components.

Examples of materials which have been tested successfully for the coating 44 (FIGS. 1–3) are $TiO_2$, $SiO$, $SiO_2$, $Sb_2S_3$, $MgF_2$, $LaF_3$, and $ZnS$, each in the order of 500 angstroms thick all vapor deposited in a vacuuum, and blue iron oxide (magnitite). Of these, the $MgF_2$ and $LaF_3$ are interference films, while the deposited $TiO_2$, $SiO$, $SiO_2$, and $Sb_2S_3$ partially combine with the iron to provide a combination of birefringence and interference. Since the deposited ZnS is blue, it is assumed that it, too, has combined with the iron in some degree to yield an amount of birefringence as well as interference. The blue iron oxide, prepared by simple heating the iron film 34 (in this case 2000 angstroms thick) in air, until it turns blue in appearance, is believed to provide birefringence. Since the light is incident upon the reflector at an angle, all of the aforesaid birefringent materials provide also optical activity.

Examples of materials which have been tested successfully for the dispersive element 56 (FIG. 4) are Z-cut quartz, which is optically active, that is, has rotary power, and X-cut quartz, Y-cut quartz, sapphire, mica, and cellophane, each of which is birefringent, that is, forms a retardation plate. Each of these was in the order of 0.01 to 0.10 mm. thick.

While numerous of the above have been employed in every case successfully with nickel and nickel-iron thin film reflectors, iron, which yields a larger Kerr effect, is the preferred material. Both mercury arc and zirconium arc sources have been employed without appreciable difference in result.

Examples of certain favorable combinations tested are as follows:

| Element 44 | Element 56 | Kerr Reflector | Best Color Change |
| --- | --- | --- | --- |
| $MgF_2$, index of refraction 1.3—240 angstroms thick. | | Fe | Green-Blue. |
| $TiO_2$, index of refraction 2.1—400 angstroms thick. | | Fe | Yellow-Blue. |
| $Sb_2S_3$, index of refraction 3.0—1,050 angstroms thick. | | Fe | Yellow-Blue (observed also notably good red-green with different analyser setting). |
| $SiO_2$ [1] | | Fe | Red-Blue. |
| Blue oxidized surface on iron, probably thin $Fe_3O_4$. | | Fe | Yellow-Blue [2]. Red-Deep Blue [3]. |
| | X-cut quartz 0.02 mm. thick. | Fe | Yellow-Blue. |

[1] Sample was made before thickness measuring equipment was available. Probably in 800 A. to 1500 A. range. Sample appeared red, probably because of oxidation of the iron.
[2] Sample and Setting II.
[3] Sample and Setting I.

In each case the light source was a 30 atmosphere operating pressure, 1000 watt mercury-xenon short arc lamp, except for the thin blue iron sample I, in which case the source was a 100 watt zirconium concentrated arc lamp, and the analyser was set to yield blue with one magnetic state. This blue setting provides a desirable physiological contrast.

It will be understood that not only the analyser but also the polarizer and the angle of incidence afford means of adjustment for selection of the most desired color contrast.

As shown in FIG. 1, the plane polarizing axis 58 of the analyser 16 should be approximately at right angles to the plane polarizing axis 60 of the polarizer 12, with the axis of the analyser deviating from quadrature with the polarization plane of light incident on the device 14 or 14' for suppression of one chosen color in one state of magnetization of the device.

In order to provide an n component for cooperation with the Kerr component so as to enable plane polarization or near plane polarization for suppression of the aforesaid chosen color in one magnetization state, the plane of polarization of the incident chosen light should deviate from the plane of incidence by a small amount. Alternatively the entire filter system can be rotated 90 degrees to reverse the roles of the p and n components. The plane of incidence of the light should be in alignment with the easy axis 40 of the reflector where, as in the case of iron, that easy axis lies in the plane of the reflective film, since to the degree that it is not, the Kerr effect is lost.

It will be seen that the introduction of the mosaic controllable Kerr component converts the dispersion of the light, or, more accurately, enters into the dispersion of the light, in such manner as to provide variably suppressible components for enabling the display. Furthermore, it will be seen from the foregoing that it becomes a matter of choice to select the desired color contrasts, by material and thickness determination of the dispersing agents 44 and/or 56, adjustment of the relationship of the polarizer and analyser axes relative to each other and relative to the plane of incidence, adjustment of the angle of incidence, and even by varying the color content of the source 10, to achieve the color components and physiological contrast desired.

The controllable mosaic pattern may be achieved by use of a single bistable magnetic film, such as the film 32 herein, wherein the magnetic domains can be set up as desired and adjacent parts of a single magnetic state become, at least in effect, single magnetic domains, or the film 32 can be broken into a plurality of small sections or "bits," such as one for each control site, to the same end result.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a display device adapted to provide an image, a source of collimated polychromatic light, first and second plane polarizing filters, and chromatic rotary dispersing means between the two filters, said dispersing means comprising Kerr magneto-optic means and additional chromatic dispersing means for coaction wtih said Kerr magneto-optic means to provide for alteration of the polarization of color components of the light passed to said second filter, said alteration being in a manner which is dependent upon and alterable with reversal of the Kerr component generated by said magneto-optic means, said Kerr means comprising metallic reflector means of bistable magnetically anisotropic material, and control means comprising a grid of drive lines operatively associated with said reflector means and adapted to provide switching flux for producing a selectively variable mosaic pattern in the magnetic state of said reflector means, whereby the light passing said second filter is differentiated to provide a polychromatic image in accordance with said mosaic pattern.

2. The combination of claim 1 wherein said additional dispersing means comprises interference film means on said metallic reflector means.

3. The combination of claim 1 wherein said additional dispersing means comprises birefringent film means on said metallic reflector means.

4. The combination of claim 1 wherein said additional dispersing means comprises optically active means between said first polarizer filter and said reflector means.

5. The combination of claim 1 wherein said additional dispersing means comprises retardation plate means between said first polarizer filter and said reflector means.

6. In a display device adapted to provide an image, a source of collimated polychromatic light, first and second plane polarizing filters, and chromatic rotary dispersing means between the two filters, said dispersing means comprising metallic Kerr magneto-optic reflector means and additional color dependent phase change means for coaction with said Kerr magneto-optic means to provide for alteration of the polarization of color components of the light passed to said second filter, said alteration being in a manner which is dependent upon and alterable with reversal of the Kerr component generated by said magneto-optic means, and means for establishing a mosaic pattern in the magnetic state of said reflector means and including control means providing a switching flux for selectively varying said mosaic pattern, whereby the light passing said second filter is differentiated to provide a polychromatic image in accordance with said mosaic pattern.

References Cited in the file of this patent

UNITED STATES PATENTS

| | | |
|---|---|---|
| 2,638,816 | Stolzer | May 19, 1953 |
| 2,984,825 | Fuller et al. | May 16, 1961 |